US010199191B2

(12) United States Patent
Balzam

(10) Patent No.: US 10,199,191 B2
(45) Date of Patent: Feb. 5, 2019

(54) COVER OF CONTACTOR OF STARTER FOR MOTOR VEHICLE

(71) Applicant: VALEO EQUIPEMENTS ELECTRIQUES MOTEUR, Creteil (FR)

(72) Inventor: Sébastian Balzam, Bedzin (PL)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 15/320,212

(22) PCT Filed: Jul. 3, 2015

(86) PCT No.: PCT/EP2015/065179
§ 371 (c)(1),
(2) Date: Dec. 19, 2016

(87) PCT Pub. No.: WO2016/001399
PCT Pub. Date: Jan. 7, 2016

(65) Prior Publication Data
US 2017/0125193 A1 May 4, 2017

(30) Foreign Application Priority Data
Jul. 3, 2014 (EP) .................................... 14306082

(51) Int. Cl.
*H01H 51/00* (2006.01)
*H01H 50/02* (2006.01)
(Continued)

(52) U.S. Cl.
CPC .......... *H01H 50/023* (2013.01); *H01H 11/00* (2013.01); *H01H 50/026* (2013.01); *H02K 7/006* (2013.01); *H01H 2011/0081* (2013.01)

(58) Field of Classification Search
CPC ........ H01H 50/54; H01H 50/64; H01H 65/00; H01H 65/02; H01H 65/04; H01H 67/02; H01H 51/065
(Continued)

(56) References Cited

U.S. PATENT DOCUMENTS 3,815,060 A * 6/1974 Turnbull .............. H01H 50/546
335/131
4,604,597 A * 8/1986 Bogner ................ H01H 51/065
335/127
(Continued)

FOREIGN PATENT DOCUMENTS

EP 0878814 A1 11/1998
EP 2282316 A1 2/2011
FR 2740604 A1 4/1997

*Primary Examiner* — Shawki S Ismail
*Assistant Examiner* — Lisa Homza
(74) *Attorney, Agent, or Firm* — Berenato & White, LLC

(57) ABSTRACT

The present invention refers to a cover (17) of a contactor (1) of a starter for motor vehicle, comprising —a plastic portion (18) delimiting a contact chamber (15) volume, —two plugs (43, 45) in an electrical conductor material which cross the plastic portion, each of the two plugs (43, 45) having an end in the contact chamber (15), —a seal (37) which is arranged on the plastic portion (18) to isolate the contact chamber (15) when the cover (17) is assembled with a coil casing (5) of the contactor (1), the seal (37) being assembled in a fixed manner to the cover (17).

16 Claims, 2 Drawing Sheets

(51) Int. Cl.
*H02K 7/00* (2006.01)
*H01H 11/00* (2006.01)

(58) Field of Classification Search
USPC .......................................................... 335/154
See application file for complete search history.

(56) References Cited

U.S. PATENT DOCUMENTS

| | | | | |
|---|---|---|---|---|
| 4,727,344 | A * | 2/1988 | Koga | H01F 7/1646 |
| | | | | 335/229 |
| 5,025,237 | A * | 6/1991 | Yamazaki | H01H 50/10 |
| | | | | 335/128 |
| 5,424,700 | A * | 6/1995 | Santarelli | H01H 1/06 |
| | | | | 335/126 |
| 5,892,422 | A * | 4/1999 | Montaigu | H01H 51/065 |
| | | | | 335/126 |
| 5,973,581 | A * | 10/1999 | Jacquin | H01H 51/065 |
| | | | | 335/126 |
| 6,049,263 | A * | 4/2000 | Vilou | H01H 51/065 |
| | | | | 290/38 R |
| 7,199,687 | B2 * | 4/2007 | Maruhashi | F02N 15/063 |
| | | | | 335/131 |
| 8,928,436 | B2 * | 1/2015 | Hirabayashi | H01H 51/065 |
| | | | | 335/131 |
| 9,177,744 | B2 * | 11/2015 | Biessenberger | H01H 51/065 |
| 2011/0068133 | A1 * | 3/2011 | Painchaud | B65D 47/18 |
| | | | | 222/494 |
| 2012/0319806 | A1 * | 12/2012 | Mills | H01H 50/12 |
| | | | | 335/185 |

\* cited by examiner

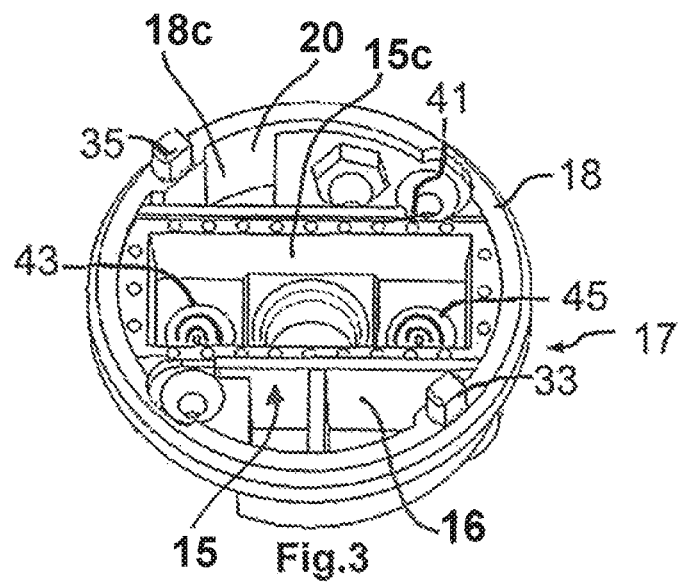
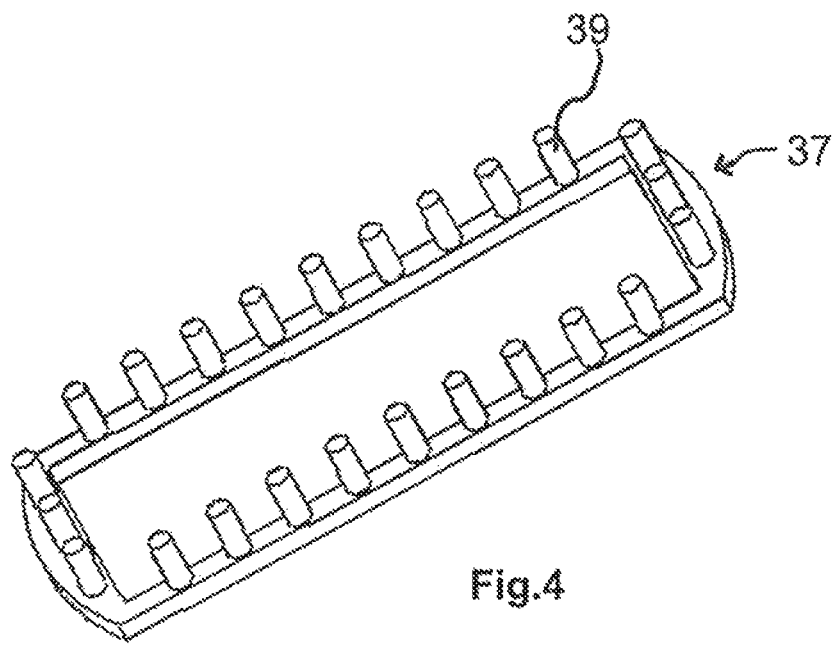

COVER OF CONTACTOR OF STARTER FOR MOTOR VEHICLE

CROSS-REFERENCE TO RELATED APPLICATIONS AND CLAIM TO PRIORITY

This application is a national stage application of International Application No. PCT/EP2015/065179 filed Jul. 3, 2015, which claims priority to European Patent Application No. 14306082.0 filed Jul. 3, 2014, the disclosures of which are incorporated herein by reference and to which priority is claimed.

FIELD OF THE INVENTION

The present invention refers to the domain of the starters for motor vehicles and more particularly to the contactor of the starters.

BACKGROUND OF THE INVENTION

The contactors of the state of the art comprise a coil arranged in a coil casing and configured for moving axially the mobile part of a magnetic core located in the center of the coil. The magnetic core is acting on a rod which controls a contact plate located outside of the coil casing in a contact chamber. The contact plate is destined for joining two electrical contacts having their ends in the contact chamber when the mobile part of the magnetic core is moved axially by the coil. The contact chamber is delimited by a cover through which the two electrical contacts are arranged. The cover is fastened to the coil casing. Furthermore, in order to ensure the isolation of the contact chamber in particular against humidity, a seal is needed between the cover and the coil casing. In the state of the art, the seal is made using a rubber seal which is positioned during assembly of the cover thanks to coil wires going through the cover. However, with such seal, there is a risk of deformation of the seal during transport (before assembly on the contactor) due to the flexibility of the material so that dedicated packaging needs to be foreseen leading to extra costs. Furthermore, the positioning of the seal is cumbersome and there is a risk of incorrect positioning which may lead to an isolation failure that may induce humidity to enter into the chamber and may cause lack of electrical contact due to the formation of ice on the contacts in low temperature. Ice is formed due to humidity condensation on terminals because of the temperature gradient induced by the accelerated cooling of the terminals with respect to the internal contact chamber temperature.

SUMMARY OF THE INVENTION

It is therefore an object of the present invention to overcome the precited drawbacks of the state of the art and to provide a solution enabling to ease the assembly of the contactor while ensuring a correct isolation.

Thus, the present invention refers to a cover of a contactor of a starter for motor vehicle, comprising
  a plastic portion delimiting a contact chamber volume,
  two plugs in an electrical conductor material which cross the plastic portion, each of the two plugs having an end in the contact chamber,
  a seal which is arranged on the plastic portion to isolate the contact chamber when the cover is assembled with a coil casing of the contactor, the seal being assembled in a fixed manner to the cover.

According to another aspect of the present invention, the seal is assembled to the plastic portion by overmolding.

According to a further aspect of the present invention, the plastic portion and the seal are obtained by a bi-injection process.

According to another aspect of the present invention, the plastic portion and the seal are assembled together using a self-adhesive tape.

According to another aspect of the present invention, the plastic portion and the seal are glued together.

According to an additional aspect of the present invention, the seal and the plastic portion comprise a plurality of pins and a plurality of holes complementary to the pins to ensure the fixation of the seal to the cover.

According to another aspect of the present invention, the pins have a length comprised in a range from 2 to 5 mm and a diameter comprised in a range from 1 to 3 mm.

According to a further aspect of the present invention, the seal comprises more than ten pins and wherein the pins are spaced apart of 3 to 10 mm.

According to an additional aspect of the present invention, the seal has a rectangular shape.

According to another aspect of the present invention, the seal is made of thermoplastic elastomer.

According to another aspect of the present invention, the seal is around the chamber in order to add a contact plate after the seal on the cover.

According to another aspect of the present invention, the seal comprise an opening corresponding to a contact plate of the contactor.

This allows facilitating the process by mounting the seal on the cover and adding a contact plate with a rod after with a fixed part and the other elements of the contactor.

The present invention also refers to a contactor comprising a cover as disclosed above.

According to another aspect of the invention, the contactor comprising a fixed part of the magnetic core, a contact plate which is between the magnetic core and the two plugs, and wherein the seal is around the contact plate.

The present invention also refers to a starter comprising a contactor as disclosed above.

BRIEF DESCRIPTION OF THE DRAWINGS

FIG. 3 represents a diagram of a cover according to the present invention;
FIG. 4 represents a diagram of a seal according to the present invention.

In these drawings, the elements having the same reference correspond to elements having a similar function.

DETAILED DESCRIPTION OF THE PREFERRED EMBODIMENT(S)

Figure 1:
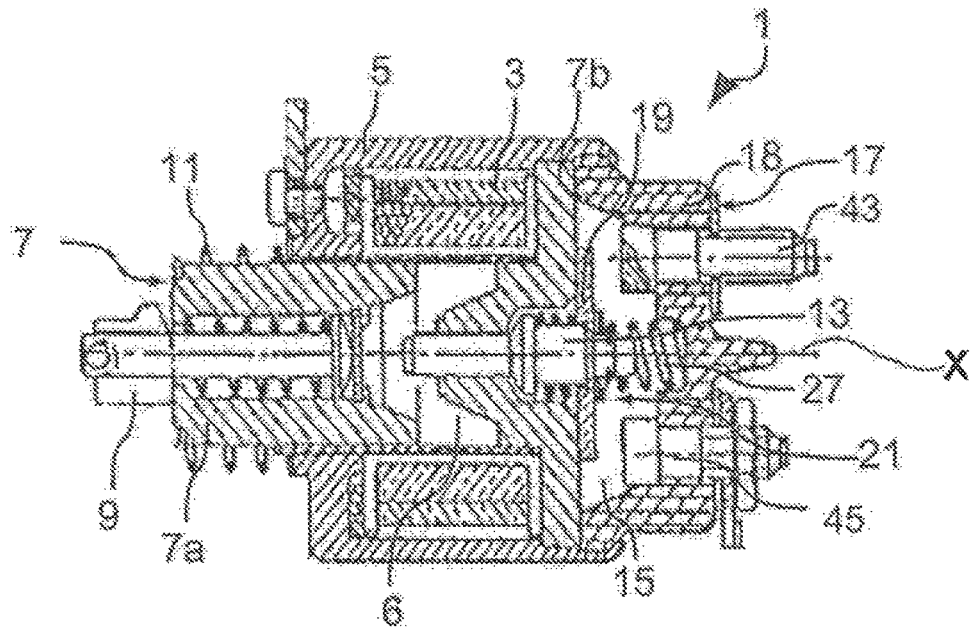
FIG. 1 represents a sectional view of a contactor.
Figure 2:
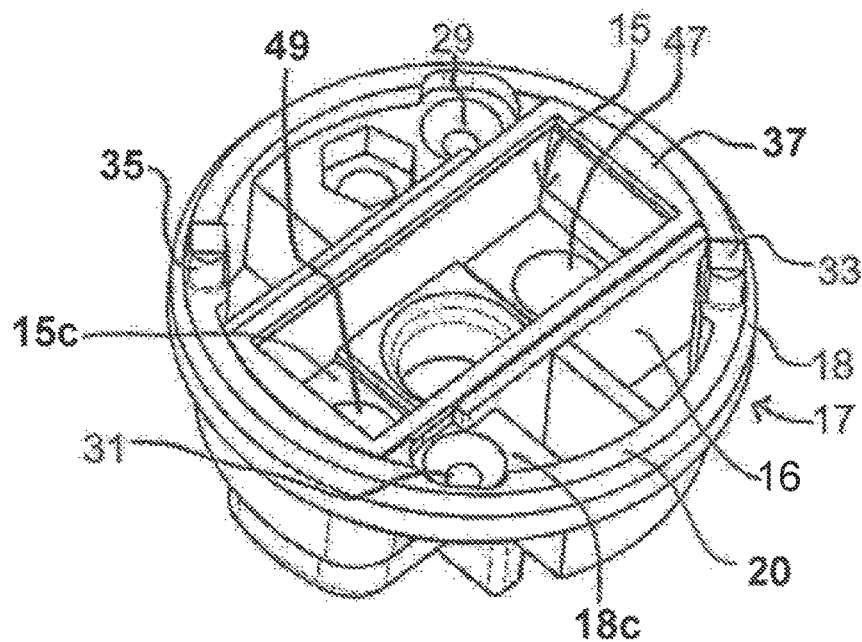
FIG. 2 represents a diagram of a cover and an associated seal according to the present invention.

FIG. 1 represents a diagram of a contactor 1 of a starter comprising a coil 3 located in a coil casing 5. The contactor 1 (i.e., the cover 17 also) has a center axis X, best shown in FIG. 1. The center of the coil 3 defines a tubular chamber 6 wherein a magnetic core 7 is arranged. The magnetic core 7 comprises a mobile part 7a configured to be displaceable axially from a rest position represented in FIG. 1 to an active position. In this rest position, the mobile part 7a is in contact with a stop 9 under the constraint of a first helicoidal spring 11. In the active position, the mobile part 7a of the magnetic core comes in contact with a fixed (i.e., non-moveable) part 7b of the magnetic core 7 under the action of the coil 3. When moving to the active position, the mobile part 7a of the magnetic core 7 acts on a rod 13, also called contact axis, which lies from the tubular chamber 6 through the fixed part 7b of the magnetic core 7 and protrudes in a contact chamber 15 defined in a cover 17. The cover 17 includes a body portion 18 delimiting the contact chamber 15, and two plugs 43 and 45 extending axially through the body portion 18. The body portion 18 has an axially extending continuous side wall 20 defining a cover cavity 18c therewithin. As best shown in FIG. 2, the contact chamber 15 is disposed within the side wall 20 of the body portion 18. In turn, the contact chamber 15 has an axially extending continuous side wall 16 defining a contact cavity 15c therewithin. As best shown in FIGS. 2 and 3, the axially extending continuous side wall 16 of the contact chamber 15 is distinct from the continuous side wall 20 of the plastic body portion 18. Each of the plugs 43 and 45 is made of an electrically conductive material. The body portion 18 of the cover 17 is fastened to the coil casing 5 and is crossed by the two conductive plugs 43 and 45 each having an inner end protruding into the contact chamber 15 and an outer end disposed outside to body portion 18. The two conductive plugs 43 and 45 protrude therefore on one side of the contact chamber 15 whereas the rod 13 protrudes on the opposite side. The rod 13 is linked to a contact plate 19 located in the contact chamber 15, so that the rod 13 and the contact plate 19 form a contact element 21. The contact plate 19 is arranged to come into contact with both conductive plugs 43 and 45 when the contact element 21 is moved by the displacement of the moving part 7a of the magnetic core 7 in the active position. The contact element 21 is therefore configured to be displaceable between a first position, wherein the contact plate 19 is in contact with the fixed part 7b of the magnetic core 7, and a second position, wherein the contact plate 19 comes into contact with conductive plugs 43 and 45. A second helicoidal spring 27 is disposed between the cover 17 and the contact element 21 to force the contact element 21 in the first position when the moving part 7a of the magnetic core 7 is in its rest position.

The cover 17 will now be described in more details based on FIG. 2.

The cover 17 comprises a circular face that comes into contact with the fixed part 7b of the magnetic core 7 and with the coil casing 5 surrounding the magnetic core 7. The cover 17 is fastened to the coil casing 5 or to the fixed part 7b of the magnetic core 7 for example thanks to coil ends (not represented in FIG. 2) arranged through the holes 29 and 31. The cover 17 may comprise a positioning coding such as a pair of pins 33 and 35 in the present case in order to ensure the right positioning of the cover 17 on the coil casing 5 or the fixed part of the magnetic core 7. The cover comprises two plugs 43 and 45 (represented in FIG. 3) made of an electrical conductor material, for example copper, that protrude in the contact chamber 15 through dedicated holes 47 and 49.

Furthermore, a seal 37 is mounted between the body portion 18 of the cover 17 and the fixed part 7b of the magnetic core 7 to ensure a hermetic closing of the contact chamber 15 to prevent the introduction of impurities and/or humidity within the contact chamber 15. Specifically, the seal 37 is mounted on the continuous side wall 16 of the contact chamber 15 of the body portion 18 to isolate the contact chamber 15 from the coil casing 5 of the contactor 1. As best shown in FIGS. 2 and 3, the axially extending continuous side wall 16 of the contact chamber 15 and the seal 37 are at least partially radially spaced from the side wall 20 of the plastic body portion 18 so as to separate the contact cavity 15c from the cover cavity 18c. The seal 37 is mounted in a fixed manner (i.e., non-moveably attached) to the cover 17. The fixation is ensured for example by a plurality of pins 39 and complementary holes 41 as represented in FIGS. 3 and 4. The pins 39 can be arranged on the seal 37 and the holes 41 arranged on the cover 17 as represented in FIGS. 3 and 4 or the pins can also be arranged on the cover 17 so that the holes are then located on the seal 37.

In an alternative embodiment, the pins 39 can be distributed between the seal 37 and the cover 17. The number and the size of the pins 39 may vary depending on the required fixation force between the seal 37 and the cover 17. In the present case, the pins 39 have a length comprised in a range from 3 to 5 mm and a diameter comprised in a range from 1 to 3 mm. The space between two pins 39 may also vary depending on the fixation required. In the present case, the spacing is regular and is comprised in a range from 5 to 10 mm. The seal 37 has a rectangular shape but other shapes may also be chosen depending on the shape of the contact chamber 15. The structure 18 of the cover 17 is made of a plastic having a high stiffness, such as a thermoplastic material, for example a polyamide (PA46 or PA66) filled with fiber glass in different ratios or thermoset materials such as phenolic resins filled with fiber glass in different ratios, in order to apply the required pressure on the seal 37 to ensure the hermetic closing of the contact chamber 15 whatever the constraints imposed by the movement of the different elements of the contactor 1 and notably the contact element 21. Alternatively or in combination with the pins, self-adhesive tape or glue can be used for assembly of the seal to the cover.

The seal 37 is made of a plastic, for example a thermoplastic elastomer or a rubber which can be injected such as TPE du type EPDM-PP like the Santoprene™ which is softer than the plastic used for the plastic portion 18 of the cover 17 and that can be compressed between the cover 17 and the fixed part 7b of the magnetic core 7 or the coil casing 5 to ensure the hermetic closing of the contact chamber 15. Furthermore, the plastic of the seal 37 needs to be adapted to be injected or overmolded.

According to a first embodiment, the seal 37 is overmolded directly on the cover 17.

According to a second embodiment, the plastic portion 18 of the cover 17 and the seal 37 are obtained by bi-injection.

With these processes, the manufacturing of the seal 37 is easy. Furthermore, there is no problem of placement or deformation of the seal 37 before assembly as the seal 37 is already placed in fixed manner on the cover 17 during manufacturing. The risk of leaks due to a noncompliant seal 37 is therefore greatly reduced.

The invention claimed is:

1. A cover (17) of a contactor (1) of a starter for a motor vehicle, the cover (17) having a center axis (X) and comprising:
   a plastic body portion (18) having an axially extending continuous side wall (20) defining a cover cavity (18c) therewithin, the plastic body portion (18) delimiting a contact chamber (15) disposed within the side wall (20), the contact chamber (15) having an axially extending continuous side wall (16) defining a contact cavity (15c) therewithin,
   two plugs (43, 45) of an electrically conductive material extending axially through the plastic body portion (18), each of the two plugs (43, 45) having an end in the contact chamber (15); and a seal (37) mounted on the continuous side wall (16) of the contact chamber (15) of the plastic body portion (18) to isolate the contact chamber (15) from a coil casing (5) of the contactor (1) when the cover (17) is assembled with the coil casing (5) of the contactor (1), the seal (37) being assembled in a fixed manner to the cover (17);

the axially extending continuous side wall (16) of the contact chamber (15) and the seal (37) at least partially radially spaced from the side wall (20) of the plastic body portion (18) so as to separate the contact cavity (15c) from the cover cavity (18c).

2. The cover (17) in accordance with claim 1 wherein the seal (37) is assembled to the plastic body portion (18) by overmolding.

3. The cover (17) in accordance with claim 2, wherein at least one of the seal (37) and the plastic body portion (18) includes a plurality of pins (39) and at least one of the other of the seal (37) and the plastic body portion (18) includes a plurality of holes (41) complementary to the pins (39) to non-moveably attach the seal (37) to the plastic body portion (18) of the cover (17).

4. The cover (17) in accordance with claim 1 wherein the plastic body portion (18) and the seal (37) are formed by a bi-injection process.

5. The cover (17) in accordance with claim 4, wherein at least one of the seal (37) and the plastic portion (18) includes a plurality of pins (39) and at least one of the other of the seal (37) and the plastic body portion (18) includes a plurality of holes (41) complementary to the pins (39) to non-moveably attach the seal (37) to the plastic body portion (18) of the cover (17).

6. The cover (17) in accordance with claim 1, wherein at least one of the seal (37) and the plastic body portion (18) includes a plurality of pins (39) and at least one of the other of the seal (37) and the plastic body portion (18) includes a plurality of holes (41) complementary to the pins (39) to non-moveably attach the seal (37) to the plastic body portion (18).

7. The cover (17) in accordance with claim 6, wherein each of the pins (39) has a length in a range from 2 to 5 mm and a diameter in a range from 1 mm to 3 mm.

8. The cover (17) in accordance with claim 7, wherein the seal (37) comprises more than ten pins (39), and wherein the pins (39) are spaced apart of 3 mm to 10 mm.

9. The cover (17) in accordance with claim 6, wherein the seal (37) comprises more than ten pins (39), and wherein the pins (39) are spaced apart of 3 mm to 10 mm.

10. The cover (17) in accordance with claim 1, wherein the seal (37) has a rectangular shape.

11. The cover (17) in accordance with claim 1, wherein the seal (37) is made of a thermoplastic elastomer.

12. The cover (17) in accordance with claim 1, wherein the seal (37) is disposed around the contact chamber (15) in order to add a contact plate (19) after the seal (37) is mounted to the cover (17).

13. The cover (17) in accordance with claim 1, wherein the seal (37) comprises an opening corresponding to a contact plate (19) of the contactor.

14. A contactor (1) comprising a cover (17) according to claim 1.

15. The contactor (1) according to claim 14, further comprising a magnetic core (7) having a fixed part (7b), a contact plate (19) disposed between the magnetic core fl) and the two plugs (43, 45), wherein the seal (37) is disposed around the contact plate (19).

16. A starter comprising a contactor (1) according to claim 14.

* * * * *